April 17, 1928.

A. Y. DODGE 1,666,558

BRAKE OPERATING MEANS

Filed Oct. 27, 1927

INVENTOR
ADIEL Y. DODGE
BY
M. W. McConkey
ATTORNEY

Patented Apr. 17, 1928.

1,666,558

UNITED STATES PATENT OFFICE.

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS.

BRAKE-OPERATING MEANS.

Application filed October 27, 1927. Serial No. 228,997.

This invention relates to brakes and is illustrated as embodied in novel operating means for a front wheel automobile brake.

One feature of the invention relates to preventing axial movement of the cam shaft of the brake, or an equivalent operating shaft, by means of a key or the like projecting into a groove in the shaft and held in a slot in a bracket which forms the shaft bearing. Preferably, the key is held in the slot in the bracket by the wall of an opening in a support carrying the bracket, the support in the illustrated arangement being the backing plate of the brake.

The above and other objects and features of the invention, including various novel and desirable details of construction, will be apparent from the following description of the illustrative embodiment shown in the accompanying drawing, in which.

Figure 1:
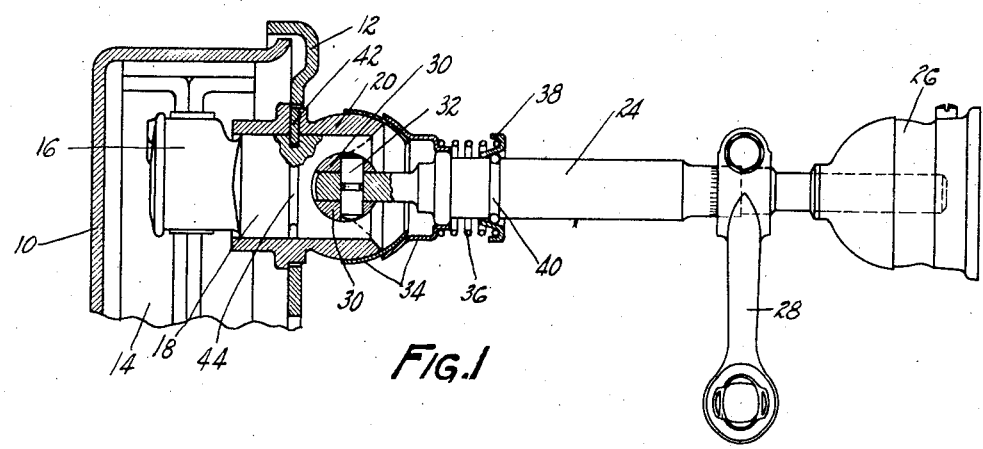
Figure 1 is a partial vertical section through the upper part of the brake, and showing the operating means partly in vertical section and partly in elevation.
Figure 2:
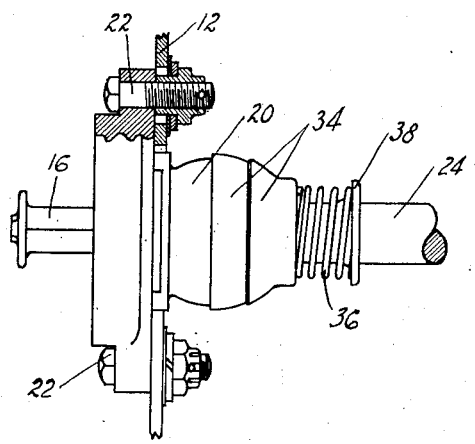
Figure 2 is a top plan view of the left end of the novel operating means, partly broken away in horizontal section.
Figure 3:
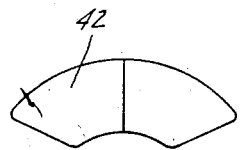
Figure 3 is a side elevation of the key.

The brake selected for illustration includes a rotatable drum 10, at the open side of which is a suitable support such as a backing plate 12, and within which is arranged the friction means 14 of the brake. The backing plate 12 is carried in the usual manner by the front or rear axle. The brake is applied by a device such as a double cam 16, preferably integral with a shaft 18 journaled in a bearing formed in a bracket 20 secured by bolts 22 to the support or backing plate 12. The shaft 18 is turned to apply the brake by a second shaft 24 slidably and universally mounted at its inner end on a support 26 carried by the side member of the chassis frame and carrying an operating arm 28. The shaft 24 operates the shaft 18 through a universal joint arranged substantially in the swiveling axis of the wheel and including a pair of outwardly-cylindrical connecting devices 30 having flat inner faces embracing the flattened end of the shaft 24 and pivotally mounted on the flattened end of the shaft 24 by a vertical pin 32. The universal joint thus formed is housed by suitable sheet metal stampings 34 held by a coil spring 36 seating against a stamping 38 resting on a snap ring 40 in a groove formed in the shaft 24.

Figure 4:
Figure 4 is a bottom plan view of the key.

According to an important feature of the present invention, axial movement of the shaft 18 is prevented by a novel key 42 projecting through a slot in the hollow bracket 20 into a circumferential groove 44 cut in the shaft 18. As will be apparent more particularly from Figure 4, the key 42 is bent when it is formed sufficiently so that when it is forced into place in the slot in the bracket 20, it will bind in the slot, thus preventing it from being accidentally displaced. Preferably, however, the key 42 is also held by reason of the fact that it is arranged in line with the wall of the opening in the backing plate or other support 12 which carries the hollow bracket 20 projecting through the above described opening.

While I have described one embodiment of the invention in detail, it is not my intention to limit its scope to that particular embodiment or otherwise than by the terms of the appended claims.

I claim:

1. In combination, a support provided with an opening, a hollow bracket projecting through said opening provided with a slot through the walls thereof in line with the walls of said opening, a rotatable shaft in said bracket provided with a groove in line with said slot, and a key received by both said slot and said groove and held against displacement by the walls of said opening.

2. In combination with a supporting part provided with an opening, a bracket provided with a part received in and guided by the walls of said opening and provided with an abutment for governing the axial position thereof in respect to said support, an opening in said bracket extending within the walls of said support, a slot in said bracket extending radially to the last mentioned opening and communicating therewith and being outwardly closed by the walls of the first mentioned opening, a shaft received in said last mentioned opening, a circumferential groove in said shaft in line with said slot, and a key received in both said slot and said groove and prevented from displacement by the walls of said first mentioned opening.

3. In combination a brake support, a hollow bracket projecting through an opening therein, a slot in the walls of said bracket in line with said support, a shaft rotatable in said bracket and provided with a groove in line with said slot, and a key received by said slot and projecting into said groove for preventing axial displacement of said shaft, said key being held from displacement by the walls of said opening.

4. In combination, a brake support provided with an opening, a bracket received in and guided by the walls of said opening and secured to said support, an opening through said bracket, a slot in said bracket in line with said support and extending from the outer surface thereof into the last mentioned opening, a shaft rotatably received in said last mentioned opening provided with a circumferential groove in line with said slot, and a key received in both said slot and said groove and prevented from displacement by the walls of the first mentioned opening whereby said shaft is held from axial movement.

5. In a braking mechanism for a motor vehicle, a brake support secured to an axle, brake shoes carried by said support, means for spreading said shoes comprising a shaft carried by a bracket on said support, means for preventing axial movement of said shaft comprising a key projecting through the walls of said bracket and engaging a groove in said shaft and held against displacement by the walls of said support, a brake operating shaft connected at one end for universal movement with the first mentioned shaft, and means for slidably and universally supporting the opposite end of said operating shaft on the frame of said vehicle.

6. In combination, a brake applying shaft formed with a groove, a hollow bracket in which said shaft is journaled and which is formed with a slot registering with said groove, and a key in the registering slot and groove which is formed in such a manner as to bind against the walls of the slot to prevent accidental displacement.

In testimony whereof, I have hereunto signed my name.

ADIEL Y. DODGE.